Jan. 31, 1961    R. H. SCHAEFER    2,969,641
AERODYNAMIC NOZZLE
Filed Oct. 17, 1955    2 Sheets-Sheet 1
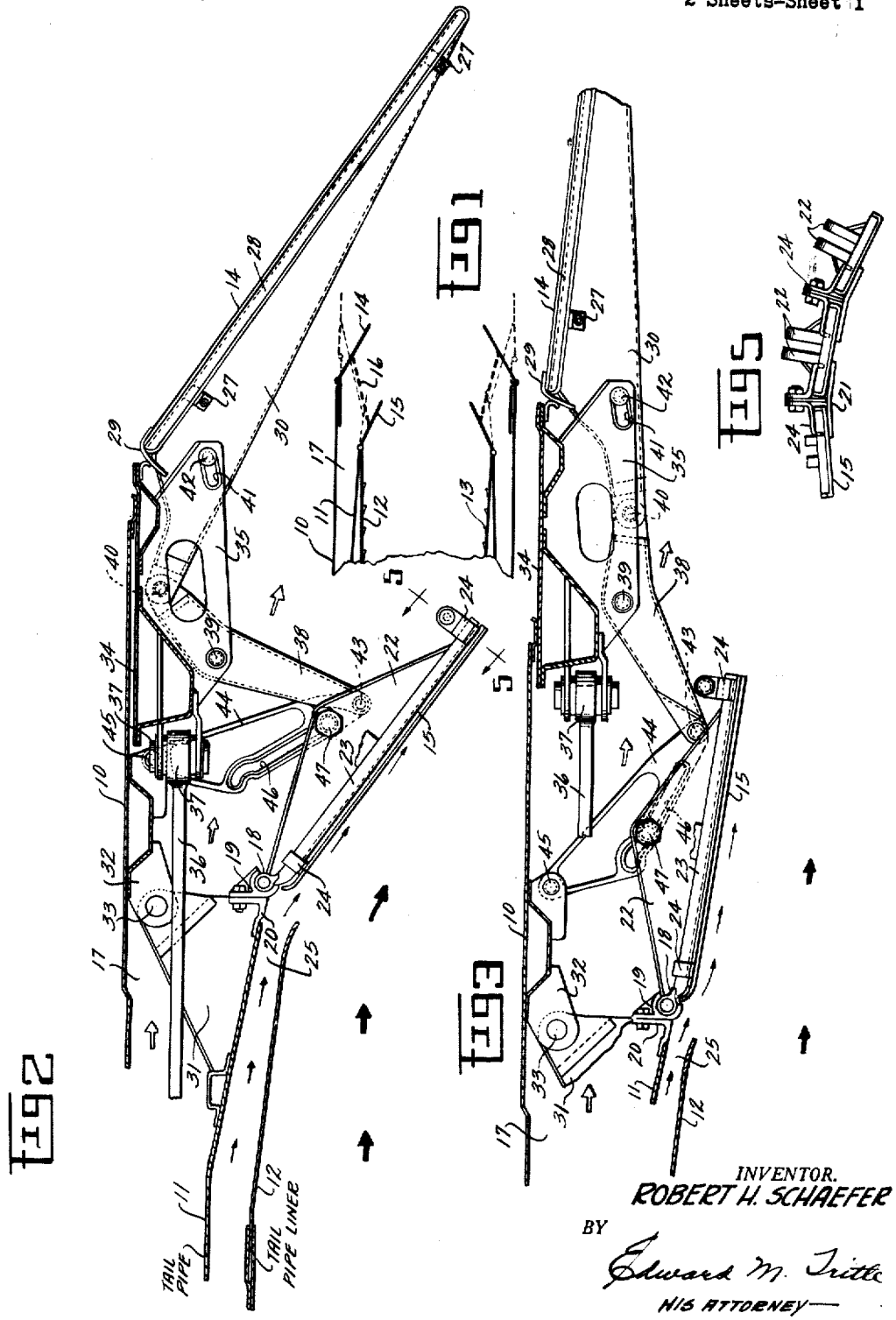
INVENTOR.
ROBERT H. SCHAEFER
BY
Edward M. Tittle
HIS ATTORNEY—

Jan. 31, 1961   R. H. SCHAEFER   2,969,641
AERODYNAMIC NOZZLE
Filed Oct. 17, 1955   2 Sheets-Sheet 2
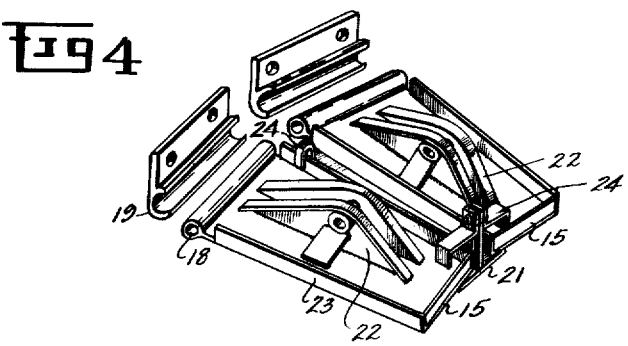
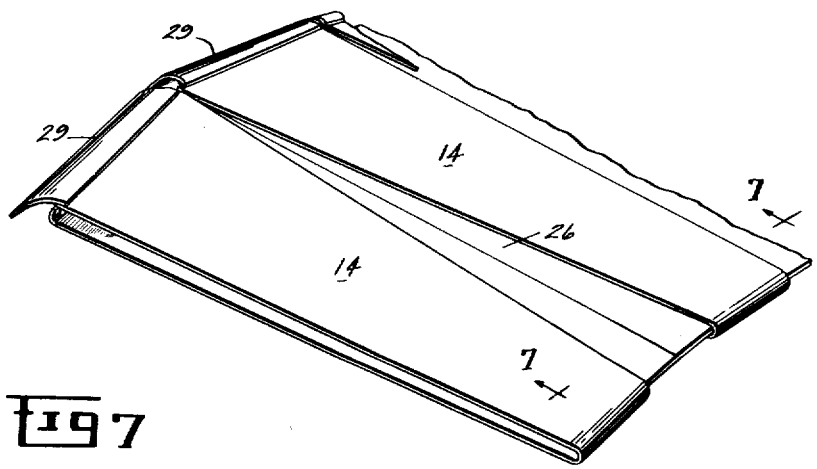
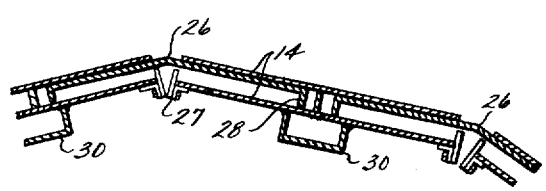
INVENTOR.
ROBERT H. SCHAEFER
BY
Edward M. Tittle
HIS ATTORNEY —

2,969,641
AERODYNAMIC NOZZLE

Robert Harold Schaefer, Stratford, Conn., assignor to General Electric Company, a corporation of New York Filed Oct. 17, 1955, Ser. No. 540,764

7 Claims. (Cl. 60—35.6)

The present invention relates to an aerodynamic nozzle and, more particularly, to the mechanical control arrangement for the operation of such a nozzle. As discussed herein, a turbojet engine is referred to, although the invention is applicable to any reaction-type power plant that operates by exhaust gas thrust where efficient operation is desirable over a wide range of operating conditions.

The exhaust nozzle of a turbojet engine has as its purpose the transformation of the pressure and thermal energy of the combustion discharge gases into velocity, the thrust of the engine being directly proportional to the increase in velocity of the gas from the entrance of the engine to the exit plane of the nozzle. It is important, therefore, that the maximum velocity increase be obtained in the nozzle. The increase in gas velocity results from passing the gas through a converging passage until sonic velocity is obtained. To increase gas velocity beyond sonic, the nozzle downstream of the sonic velocity plane must increase in area and it can be seen that for nozzle pressure ratios (ratio of throat pressure to ambient pressure) greater than the ratio for sonic velocity (approximately 1.89) a nozzle must have a passage that at first converges to a minimum or throat area, and then diverges from the throat to the exit plane. In other words, a converging-diverging nozzle is required. As the pressure ratio across the nozzle increases, the divergent requirement for optimum thrust increases.

If a turbojet engine operated at a single nozzle pressure ratio, it would be a simple matter to provide a nozzle having a fixed exit geometry tailored to fit this operating condition. Unfortunately, the engines in modern combat planes must operate over a pressure ratio range that may vary from 2/1 to 10/1, and as a further complication the temperatures of the exhaust gases vary from around 1000° F. to over 3000° F. which means that the area must increase to handle the less dense or hotter gases as exhaust gas temperature rises. In other words, the throat area of the nozzle must vary to accommodate the overall variation of both pressure and temperature of the exhaust gases and, at the same time, the area of the diverging portion of the nozzle or the exit area must also be changed for different operating conditions. The ratio of exit diameter to throat diameter (which is a function of the nozzle area) is called the expansion ratio. In addition, it is necessary to vary the ratio of the length of the diverging passage to the throat diameter. In general, this length to throat diameter relationship, which is called the spacing ratio, should increase slightly with increasing nozzle pressure ratio which therefore necessitates an axial movement of the exit plane of the nozzle as primary nozzle pressure ratio increases, and/or as throat diameter increases. There are thus three parameters that must be varied as a result of different nozzle pressure ratios and operating temperatures to provide for efficient nozzle operation. These parameters are the exit area, throat area, and spacing ratio. Under ideal conditions, the throat diameter would normally be adjusted to maintain exhaust gas temperature at an assigned value and, if a thrust signal could be obtained, the expansion ratio and spacing ratio would be adjusted for maximum thrust. In the absence of a thrust signal, the last two ratios could be adjusted as a function of the nozzle pressure ratio.

Unfortunately, at the present stage of the art, there is no satisfactory way known to applicant to obtain either a reliable thrust signal nor pressure ratio under continuous operating conditions. However, a compromise may be effected wherein certain throat areas may be selected to maintain the exhaust gas temperature and for these throat areas definite relationships must then be established between the throat area, exit area and length of the diverging passage to optimize the engine thrust over a wide range of operating conditions. It is therefore desirable that an aerodynamic nozzle be obtained which will properly schedule the three aforementioned parameters with consideration of the control systems required, the weight of the mechanism, the complexity of the control, and the reliability of the control.

The main object of the present invention, therefore, is to provide an aerodynamic nozzle that is capable of scheduling the three parameters by means of a simple mechanical linkage.

Another object is to provide a mechanical linkage system that adjusts the nozzle exit diameter and the length of the divergent passage or exit plane as a function of the nozzle throat diameter in such a way that near optimum thrust is obtained over a wide range of nozzle operating pressure ratios and primary gas temperatures.

Briefly stated, in accordance with the invention, I provide such a nozzle wherein a single control operates a mechanical linkage of cams and levers that schedule the exit diameter and spacing ratio as a function of the throat diameter.

My invention will be better understood from the following description taken in connection with the accompanying drawings and its scope will be pointed out in the appended claims.

Figure 1 is a schematic showing of an aerodynamic nozzle in accordance with the invention;

Figure 2 is a partial view of the nozzle operating mechanism with the nozzle in the closed position;

Figure 3 is a partial view similar to Figure 2 showing the operating mechanism with the nozzle in the open position;

Figure 4 is a partially exploded view in perspective showing the inner nozzle flaps and seal;

Figure 5 is a partial cross-sectional view taken on line 5—5 of Figure 2;

Figure 6 is a partial perspective view of the outer nozzle flaps and seal and;

Figure 7 is a cross-sectional view taken on line 7—7 of Figure 6 but showing the location of the flaps in closed position.

Referring first to Figure 1, there is shown an aerodynamic nozzle which may be defined as a converging-diverging nozzle wherein the walls of the diverging portion of the nozzle are walls of air as opposed to structural mechanical walls. The nozzle comprises an outer shroud 10, surrounding an inner tailpipe 11, having a liner 12 therein. Liner 12 may be connected to tailpipe 11 as is shown in Figure 1 and have louvers 13 therein for the passage of air or may be left open at its end as shown in Figures 2 and 3, or may be a combination of both. Outer and inner tapered flaps 14 and 15 are pivoted relative to shroud 10 and tailpipe 11 respectively. Flaps 14 and 15 are interconnected by mechanism 16, diagrammatically shown in Figure 1, to provide correlated movement therewith. The solid lines of Figure 1 show the flaps in the closed position and the dotted lines represent the open position.

The primary or exhaust gases pass through tailpipe 11 and their velocity is governed by the position of flaps 15 to form the converging portion of the nozzle. Secondary air is passed by any suitable manner through annular chamber or passage 17 between shroud 10 and tailpipe 11 to form an aerodynamic boundary wall between flaps 14 and the exhaust gases from tailpipe 11. The position of the air boundary wall is controlled by the position of flaps 14. While the device referred to in Figure 1 is known as a converging-diverging aerodynamic nozzle, for convenience, the inner converging portion may be referred to as the primary or inner nozzle as formed by tailpipe 11 and flaps 15 and the outer diverging portion controlled by flaps 14, the secondary or outer nozzle.

The primary nozzle consists of a plurality of peripherally spaced nozzle flaps 15 which are connected to rotate through the necessary throat range by means of a pivoted connection to tailpipe 11 to vary the throat diameter and cross-sectional area. Flaps 15 may be pivoted to tailpipe 11 by any suitable hinge means such as the type shown in Figure 4. The flaps may have a pin-like extension 18 formed integral therewith or suitably attached thereto which are received in hinge member 19 which is bolted to the aft flange 20 of the tailpipe 11. Sealing at this point is accomplished by making hinge pivot member 19 and pin extension 18 continuous across the width of each flap. This type of hinge and seal is simply fabricated and sealing does not rely on spring-like members which are difficult to maintain at high temperatures. Flaps 15 have upstanding member 22 thereon for a purpose to be described.

Sealing between flaps 15 is accomplished by providing floating metal plates 21. Plates 21 overlap the inner surface of flaps 15 sufficiently to permit sealing whether the flaps are in closed or open position. The plates are held against the nozzle flaps by internal gas pressure during engine operation. In addition, positive means are provided to maintain plates 21 in the desired position. As seen in Figure 4, flaps 15 may be formed with upstanding flanges 23 at the sides and ends thereof. Seal retaining clips 24 suitably secured to an upstanding member cooperate with flanges 23 to maintain plates 21 in position. Thus, it can be seen that plates 21 loosely float between flaps 15 and are carried thereby to provide a positive seal between the flaps whether they are in a closed position as shown in Figures 4 and 5 or are in the open position of Figure 3.

Because the nozzle flaps 15 that form the converging passage of the nozzle control the flow of gases as hot as 3200° F., it is necessary to guarantee their being cooled properly. To accomplish this cooling, gas at approximately turbine-exit temperature of around 1000° F. is directed over the inner surface of flaps 15 through the annular orifice 25 formed by the liner 12 and tailpipe 11 at the downstream end of the tailpipe as shown in Figures 2 and 3. Louvers 13, shown in Figure 1, accomplish the same purpose in cooling the liner itself in substantially the same manner. It will be appreciated that the particular plate seal 21 and its cooperative relation with flaps 15 is merely a preferred execution of the instant invention and suitable equivalent sealing means between the flaps may be employed.

The outer or shroud flaps 14 may be hollow sheet members as shown in Figure 6. Flaps 14, forming the outer or secondary nozzle, have similar sealing plates 26 between each pair of flaps. Plates 26 are, like plates 21, freely floating between adjacent flaps 14. Thus, plates 21 and 26, although floating, are restrained between adjacent flaps. A pair of stop members 27 may be axially spaced along each edge of flaps 14 to cooperate with upturned flanges 28 and retain sealing plate 26 between the flaps. Lengthwise movement of the flaps is restrained by the bights of the hollow flaps 14. Thus, the space between flaps 14 is effectively sealed by the mechanism just described whether the flaps are in the closed position, as shown in Figures 2 and 7, or in the open position, as shown in Figure 3. The forward end of flaps 14 is provided with seal 29 suitably secured thereto for a purpose to be described. Flaps 14 preferably have a strengthening member 30 extending inwardly therefrom to provide strength to the flap and an operating connection therewith. Thus, sealing plate 26 performs a function like plate 21 and also may be of obviously different constructions. Flaps 14 normally will matchingly correspond in number to flaps 15.

Outer shroud 10 is attached to tailpipe 11 by means of a plurality of circumferentially spaced brackets 31 which may be considerably fewer in number than the number of flaps. Brackets 31 are secured by a suitable connection to tailpipe 11 as shown in Figure 2. Shroud 10 has a plurality of brackets 32 peripherally spaced thereon and secured to the inner surface thereof. Thus, certain of the brackets 31 and 32 will meet around the circumference of the shroud. Brackets 31 and 32 are secured together where they meet by a pinned connection 33. Where no meeting takes place, connection 33 is blank on brackets 32. Brackets 31 may be provided with slots (not shown) at the pin connection to permit yielding for thermal expansion of the tailpipe relative to the outer shroud 10. Members 10, 11, 31, and 32 are fixed and non-moving members.

An annular concentric ring 34 which may be continuous or segmented and is part of the linkage mechanism is slidably mounted within outer shroud 10 for axial movement relative thereto to effectively extend the shroud downstream as seen in Figure 3. The downstream end of the outer shroud 10 forms a seal to avoid excessive leakage between the fixed and movable portion of the nozzle. Annular ring 34 also has a seal connection with seal 29 to prevent leakage of gas as seen in Figures 2 and 3. The annular ring 34 also forms, with shroud 10, an annular duct with the tailpipe 11 through which the secondary air is introduced or pumped into the secondary nozzle passage to form the aerodynamic wall in the diverging portion of the nozzle. Inwardly directed bracket members 35 are attached to the annular ring 34 to form a part of and move with the ring. An actuator control rod 36 is attached to ring 34 by a suitable pivoted connection 37. In the particular embodiment illustrated, it is necessary only to use four equally spaced brackets 31 around the circumference of tailpipe 11 and four actuator control rods 36 attached to annular ring 34. Of course, a fewer or greater number may be utilized as required. Actuator control rods 36 are adapted for axial movement from an outside source not shown. Such movement slides ring 34 forward as shown in Figure 2 or aft as shown in Figure 3.

A bellcrank 38 is pivoted at 39 to each of bracket members 35. One end of the bellcrank is connected to rib 30 by a pivoted connection 40. A slotted hole 41 may be provided in bracket member 35 to cooperate with pin 42 on rib 30 or vice versa to permit rotation of flap 14 therearound. The slotted hole 41 accommodates the throw of the bellcrank and permits dwell at each end of the stroke for accommodation of control overtravel and axial thermal expansion of the tailpipe relative to the actuator.

The other end of the bellcrank 38 is pivoted at 43 to cam member or lever 44, which, in turn, is pivoted to fixed bracket 32 at 45. Cam lever 44 has a cam slot 46 therein which cooperates with pivot pin 47 carried by upstanding member 22 on flap 15. It is noted that while member 22 is shown on flap 15 as a preferred execution, it is merely necessary that it be secured to a movable member of the flap mechanism so that movement of control rod 36 will actuate the flap mechanism. Cam slot 46 is predetermined to provide the proper scheduling of the various parameters through the described linkage under the actuating control mechanism 36. There is preferably a cam for each pair of inner and outer flaps, i.e. a cam between an inner flap and its corresponding outer flap.

As the nozzle mechanism is moved from the position shown in Figure 2 to that shown in Figure 3, the mechanical linkage system of levers and cams schedule the exit diameter and spacing ratio as a function of the throat diameter which is determined by the position of flaps 15. Thus, the instant mechanism provides a means whereby a single control can be used to set the throat area or diameter to maintain exhaust gas temperature and the consequent positioning by the interrelated linkage provides near maximum possible thrust under a wide range of operating conditions varying from exhaust gas velocities.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent is:

1. An aerodynamic nozzle for a reaction-type power plant comprising, an inner converging nozzle, a plurality of peripherally spaced inner flaps pivoted to the downstream edge of said nozzle to vary the nozzle throat area, an outer diverging nozzle including a fixed shroud surrounding and radially spaced from said inner nozzle to define a secondary air passage, an annular ring member concentric with said outer shroud disposed within said air passage and axially movable thereof, sealing means between said shroud and ring member, a plurality of peripherally spaced outer flaps pivoted to said ring member to vary the exit area and exit plane of said diverging nozzle, linkage means including a cam for each of a pair of inner and outer flaps, a bellcrank connecting each cam and outer flap, pivoted connecting means between each inner flap and cam, and control means connected to said linkage means to impart motion thereto, whereby said exit area and exit plane are varied as a function of the throat area.

2. An aerodynamic nozzle for a reaction-type power plant comprising, an inner converging nozzle, a plurality of peripherally spaced inner flaps pivoted to the downstream edge of said nozzle to vary the nozzle throat area, an outer diverging nozzle including a fixed shroud surrounding and radially spaced from asid inner nozzle to define a secondary air passage, an annular ring member concentric with said outer shroud disposed within said air passage and axially movable thereof, sealing means between said shroud and ring member, a plurality of peripherally spaced outer flaps pivoted to said ring member to vary the exit area and exit plane of said diverging nozzle, linkage means including a cam for each of a pair of inner and outer flaps, each cam being pivoted on said shroud, a bellcrank connected to said cam at one end and to said outer flap at the other end, said bellcrank having an intermediate pivoted connection with said ring member, a slidable pivoted connection between said cam and inner flap, and control means connected to said linkage to impart motion thereto, whereby said exit area and exit plane are varied as a function of the throat area.

3. An aerodynamic nozzle for a reaction-type power plant comprising an inner converging nozzle, an outer diverging nozzle including a fixed shroud surrounding said inner nozzle and spaced therefrom to form a secondary air passage therewith, a plurality of peripherally spaced inner flaps pivoted to said inner nozzle to vary the throat area, an axially movable ring member disposed within said passage and concentric with said shroud, sealing means between said ring member and said shroud, a matching plurality of peripherally spaced outer flaps pivoted intermediate their ends to said ring member to vary the exit area and exit plane of said outer nozzle, mechanism between each pair of inner and outer flaps including a cam pivoted to said shroud, a bellcrank pivoted intermediate its ends to said ring member, said outer flap being pivoted to one end of said bellcrank and said cam being pivoted to the opposite end of said bellcrank, a pivoted connection between the inner flap and the cam, and control means connected to said mechanism to impart motion thereto, whereby said exit area and said exit plane are varied as a function of the throat area.

4. An aerodynamic nozzle for a reaction-type power plant comprising, an inner converging nozzle, an annular fixed shroud member forming an outer nozzle fixed to said inner nozzle and spaced radially therefrom, an annular ring member concentric with said shroud and axially slidable in sealing contacting relation therewith, a plurality of inner flaps pivoted to said inner nozzle to vary the throat area thereof, a matching plurality of outer flaps pivoted intermediate their ends to said ring member to vary the exit area and exit plane of said outer nozzle, mechanism between each inner flap and its matching outer flap including a cam lever pivoted at one end to said shroud, a bellcrank pivoted intermediate its ends to said ring member, a pivoted connection between said cam lever and one end of said bellcrank, a pivoted connection between the other end of said bellcrank and the upstream end of said outer flap, a pivoted connection between said cam and inner flap and a control means connected to at least part of said mechanisms to impart motion thereto, whereby said exit area and exit plane are varied as a function of the throat area.

5. An aerodynamic nozzle for a reaction-type power plant comprising, an inner converging nozzle, an annular fixed shroud member forming an outer nozzle fixed to said inner nozzle and spaced radially therefrom, a continuous annular ring member concentric with said shroud and axially slidable in sealing contacting relation therewith, a plurality of inner flaps pivoted to said inner nozzle to vary the throat area thereof, a matching plurality of outer flaps pivoted intermediate their ends to said ring member to vary the exit area and exit plane of said outer nozzle, floating sealing means between adjacent flaps of said inner and outer flaps, mechanism between each inner flap and its outer matching flap including a cam lever pivoted at one end to said shroud, a bellcrank pivoted intermediate its ends to said ring member, a pivoted connection between the other end of said cam lever and one end of said bellcrank, a pivoted connection between the other end of said bellcrank and the upstream end of said outer flap, a cam slot in said cam lever, a pivoted connection between said cam slot and inner flap intermediate the ends of said cam lever, and a control means connected to at least part of said mechanisms to move said ring axially, whereby said exit area and exit plane are varied as a function of the throat area.

6. An aerodynamic nozzle for a reaction-type power plant comprising, an inner converging nozzle, an annular fixed shroud member forming an outer nozzle yieldingly fixed to said inner nozzle and spaced radially therefrom, a continuous annular ring member concentric with said shroud and axially slidable in sealing contacting relation therewith, a plurality of inner flaps pivoted to said inner nozzle at its downstream end to vary the throat area thereof, a matching plurality of outer flaps pivoted by slotted connections intermediate their ends to said ring member to vary the exit area and exit plane of said outer nozzle, floating sealing means between adjacent flaps of said inner and outer flaps, sealing means between said outer flaps and ring member, mechanism between each inner flap and its matching outer flap including a cam lever pivoted at one end to said shroud, a bellcrank pivoted intermediate its ends to said ring member, a pivoted connection between the other end of said cam lever and one end of said bellcrank, a pivoted connection between the other end of said bellcrank and the upstream end of said outer flap, a cam slot in said cam lever, a pivoted connection between said cam slot and inner flap intermediate the ends of asid cam lever, and a control means connected to at least part of said mechanisms to move said ring axially, whereby said exit area and exit plane are varied as a function of the throat area.

7. An aerodynamic nozzle for a reaction-type power plant comprising, an inner converging nozzle, an annular fixed shroud member forming an outer nozzle and spaced radially from said inner nozzle, a plurality of peripherally spaced brackets yieldingly connecting said inner and outer nozzles, a continuous annular ring member concentric with said shroud and axially slidable in sealing contacting relation with the downstream edge of said shroud to effectively extend said shroud downstream, a plurality of inner flaps pivoted by a sealing connection to said inner nozzle at its downstream edge to vary the throat area thereof, an equal number of outer flaps pivoted by a slotted connection intermediate their ends to said ring member to vary the exit area and exit plane of said outer nozzle, floating restrained sealing plate means between adjacent flaps of said inner and outer flaps, sealing means between said outer flaps and said ring member at the downstream edge of said ring member, mechanism between each inner flap and its matching outer flap including a cam lever pivoted at one end to said shroud, a bellcrank pivoted intermediate its ends to said ring member, a pivoted connection between the other end of said cam lever and one end of said bellcrank, a pivoted connection between the other end of said bellcrank and the upstream end of said outer flap, a cam slot in said cam lever, a pivoted connection between said cam slot and sealing plate means for said inner flap intermediate the ends of said cam lever, and a control means connected to said ring member to impart axial motion thereto, whereby said exit area and exit plane are varied as a function of the throat area.

References Cited in the file of this patent

FOREIGN PATENTS 1,018,650   France ---------------- Oct. 15, 1952